United States Patent
Sekine et al.

(10) Patent No.: US 11,262,242 B2
(45) Date of Patent: Mar. 1, 2022

(54) IDENTIFICATION APPARATUS AND SORTING SYSTEM

(71) Applicant: CANON KABUSHIKI KAISHA, Tokyo (JP)

(72) Inventors: Yasuhiro Sekine, Yokohama (JP); Shigeru Ichihara, Tokyo (JP); Yuki Yonetani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/894,601

(22) Filed: Jun. 5, 2020

(65) Prior Publication Data

US 2020/0300704 A1    Sep. 24, 2020

Related U.S. Application Data

(63) Continuation of application No. PCT/JP2018/043799, filed on Nov. 28, 2018.

(30) Foreign Application Priority Data

Dec. 8, 2017 (JP) .............................. JP2017-236226
Nov. 20, 2018 (JP) .............................. JP2018-217563

(51) Int. Cl.
*G01N 21/65* (2006.01)
*H04N 5/374* (2011.01)
(Continued)

(52) U.S. Cl.
CPC ........... *G01J 3/4412* (2013.01); *G01J 3/0218* (2013.01); *G01N 21/65* (2013.01); *H04N 5/3532* (2013.01); *H04N 5/374* (2013.01)

(58) Field of Classification Search
CPC ...... G01J 3/4412; G01J 3/0218; G01N 21/65; H04N 5/3532; H04N 5/374
See application file for complete search history.

(56) References Cited

U.S. PATENT DOCUMENTS

2008/0024778 A1    1/2008  Honda et al.
2010/0121484 A1    5/2010  Blanc et al.
(Continued)

FOREIGN PATENT DOCUMENTS

JP    H10-038807 A    2/1998
JP    2000-009446 A   1/2000
(Continued)

OTHER PUBLICATIONS

Kuta Yamaji et al.; "A Novel Separation Method for Plastic of Discarded Appliance Including Black Plastic by Using Raman Spectroscopy", Resources Processing, Feb. 2013, vol. 60, No. 2, pp. 65-71, doi: 10.4144/rpsj.60.65.

*Primary Examiner* — Jamil Ahmed
(74) *Attorney, Agent, or Firm* — Canon U.S.A., Inc. IP Division

(57) ABSTRACT

An identification apparatus includes: a plurality of light capturing units including light-capturing optical systems configured to capture a plurality of Raman scattered light fluxes from a sample, an optical fiber unit configured to include a plurality of optical fibers configured to respectively guide the captured Raman scattered light fluxes and in which the optical fibers are bundled at emission end portions thereof; a spectral element configured to disperse the guided Raman scattered light fluxes; an imaging unit configured to receive the dispersed Raman scattered light fluxes; and a data processor configured to acquire spectral data of the Raman scattered light fluxes from the imaging unit and configured to perform an identification process. The Raman scattered light fluxes dispersed by the spectral element are projected so that a spectral image formed on a light-receiving surface of the imaging unit extends along a main scanning direction of the imaging unit.

14 Claims, 3 Drawing Sheets

(51) Int. Cl.
  *H04N 5/353* (2011.01)
  *G01J 3/44* (2006.01)
  *G01J 3/02* (2006.01)

(56) References Cited

U.S. PATENT DOCUMENTS

2014/0367316 A1    12/2014  Saeedkia
2017/0286792 A1*   10/2017  Ackerman ........... H04N 5/2329

FOREIGN PATENT DOCUMENTS

| | | | | |
|---|---|---|---|---|
| JP | 2008-209128 A | 9/2008 | | |
| JP | 2009-092458 A | 4/2009 | | |
| JP | 2011-089085 A | 5/2011 | | |
| JP | 2011-226821 A | 11/2011 | | |
| JP | 2011226821 A * | 11/2011 | ............ | G01N 21/65 |
| JP | 2012-122851 A | 6/2012 | | |
| JP | 2013-036971 A1 | 2/2013 | | |
| JP | 2014-113792 A | 6/2014 | | |
| JP | 2014-115193 A | 6/2014 | | |
| WO | 2005/038443 A | 4/2005 | | |
| WO | 2012/035785 A1 | 3/2012 | | |
| WO | 2012/120779 A1 | 9/2012 | | |

* cited by examiner

IDENTIFICATION APPARATUS AND SORTING SYSTEM

CROSS-REFERENCE TO RELATED APPLICATIONS

This application is a Continuation of International Patent Application No. PCT/JP2018/043799, filed Nov. 28, 2018, which claims the benefit of Japanese Patent Applications No. 2017-236226, filed Dec. 8, 2017, and No. 2018-217563, filed Nov. 20, 2018, all of which are hereby incorporated by reference herein in their entirety.

BACKGROUND OF THE INVENTION

Field of the Invention

The present invention relates to an apparatus configured to identify a resin included in a sample and to a sorting system.

Description of the Related Art

In order to recycle various types of resins such as plastics and elastomers, which are included in household waste and industrial waste, as the raw materials of new products, it is necessary to sort the resins in the waste according to the materials of the resins. In recycling facilities, such wastes are mechanically crushed into pieces including resin pieces and metal pieces, and then these pieces are sorted by using various methods.

Examples of the methods for sorting resin pieces such as plastics include a method using Raman scattering. By using Raman scattering, it is possible to identify the materials of a resin and to analyze the compositions and distribution of the materials. It is possible to construct a high-throughput resin identification system by conveying resins by using a conveyor such as a belt conveyer and by identifying the materials by detecting Raman scattered light fluxes from the resins that are conveyed.

Japanese Patent Application Laid-Open No. 2011-226821 describes a plastic identification apparatus including a plurality of Raman spectral instruments that are arranged in a direction perpendicular to the conveyance direction of a belt conveyer, that is, the transverse direction of the belt conveyer. With this apparatus, it is possible to identify plastics to be identified at a plurality of positions in the transverse direction of the belt conveyer and to further improve the throughput of identification.

Japanese Patent Application Laid-Open No. 2012-122851 describes a Raman analysis apparatus including a plurality of probe heads that respectively capture Raman scattered light fluxes from different measurement positions. The Raman analysis apparatus described in Japanese Patent Application Laid-Open No. 2012-122851 includes an optical fiber unit in which a plurality of optical fibers, for guiding light beams from the probe heads, are bundled at emission end portions thereof. A plurality of Raman scattered light fluxes, respectively captured from different measurement positions, are dispersed by using one diffraction grating and imaging is performed by using one CCD camera. By doing so, it is possible to simultaneously perform spectroscopic measurement of Raman scattered light fluxes from a plurality of positions by using one spectroscope.

The plastic identification apparatus described in Japanese Patent Application Laid-Open No. 2011-226821 has a problem in that the entire configuration of the identification apparatus is complex and the apparatus cost is high, because the plurality of Raman spectral instruments are disposed as they are. Therefore, it is conceivable that the apparatus configuration may be simplified and the apparatus cost may be reduced by integrating the spectroscope portion by using an optical bundled fiber and a CCD camera, as described in Japanese Patent Application Laid-Open No. 2012-122851.

It is required to perform an identification process at high speed in order to identify resin pieces that are conveyed on the belt conveyer at high speed as in Japanese Patent Application Laid-Open No. 2011-226821. Therefore, instead of a CCD image sensor, a CMOS image sensor that can read out signals at high speed may be used. The inventors carried out intensive examination and found a new problem in that, when an imaging unit such as a CMOS image sensor that serially reads out a signal for each pixel line, the speed of the identification process decreases depending on the dispositions of the imaging unit and the spectral element.

SUMMARY OF THE INVENTION

The present invention provides a resin identification apparatus that can identify a resin piece that is conveyed on a belt conveyer, at high speed and with a simple apparatus configuration.

An identification apparatus according to an aspect of the present invention is an identification apparatus configured to identify a resin included in a sample. The identification apparatus includes: a plurality of light capturing units configured to capture a plurality of Raman scattered light fluxes from the sample; a plurality of optical fibers configured to guide the plurality of captured Raman scattered light fluxes; a spectral element configured to disperse the plurality of guided Raman scattered light fluxes; an imaging unit configured to be disposed so as to receive the plurality of dispersed Raman scattered light fluxes and configured to capture an image by performing main scanning and sub-scanning, the sub-scanning being performed in a sub-scanning direction configured to cross a main scanning direction of the main scanning and at a frequency lower than a frequency of the main scanning; and a data processor configured to acquire spectral data of the plurality of Raman scattered light fluxes from the imaging unit and configured to perform an identification process of identifying the sample. The plurality of optical fibers have emission ends configured to guide the plurality of Raman scattered light fluxes toward the spectral element, and the emission ends and the spectral element are disposed so that a spectral image configured to be formed on the imaging unit so as to correspond to one of the plurality of Raman scattered light fluxes extends along the main scanning direction of the imaging unit.

Further features of the present invention will become apparent from the following description of exemplary embodiments with reference to the attached drawings.

DESCRIPTION OF THE EMBODIMENTS

The present invention is not limited to the embodiments described below. Modifications and improvements that are appropriately made to the embodiments within the sprit and scope of the present invention based on general knowledge of a person having ordinary skill in the art are included in the scope of the present invention.

First Embodiment

Figure 1:
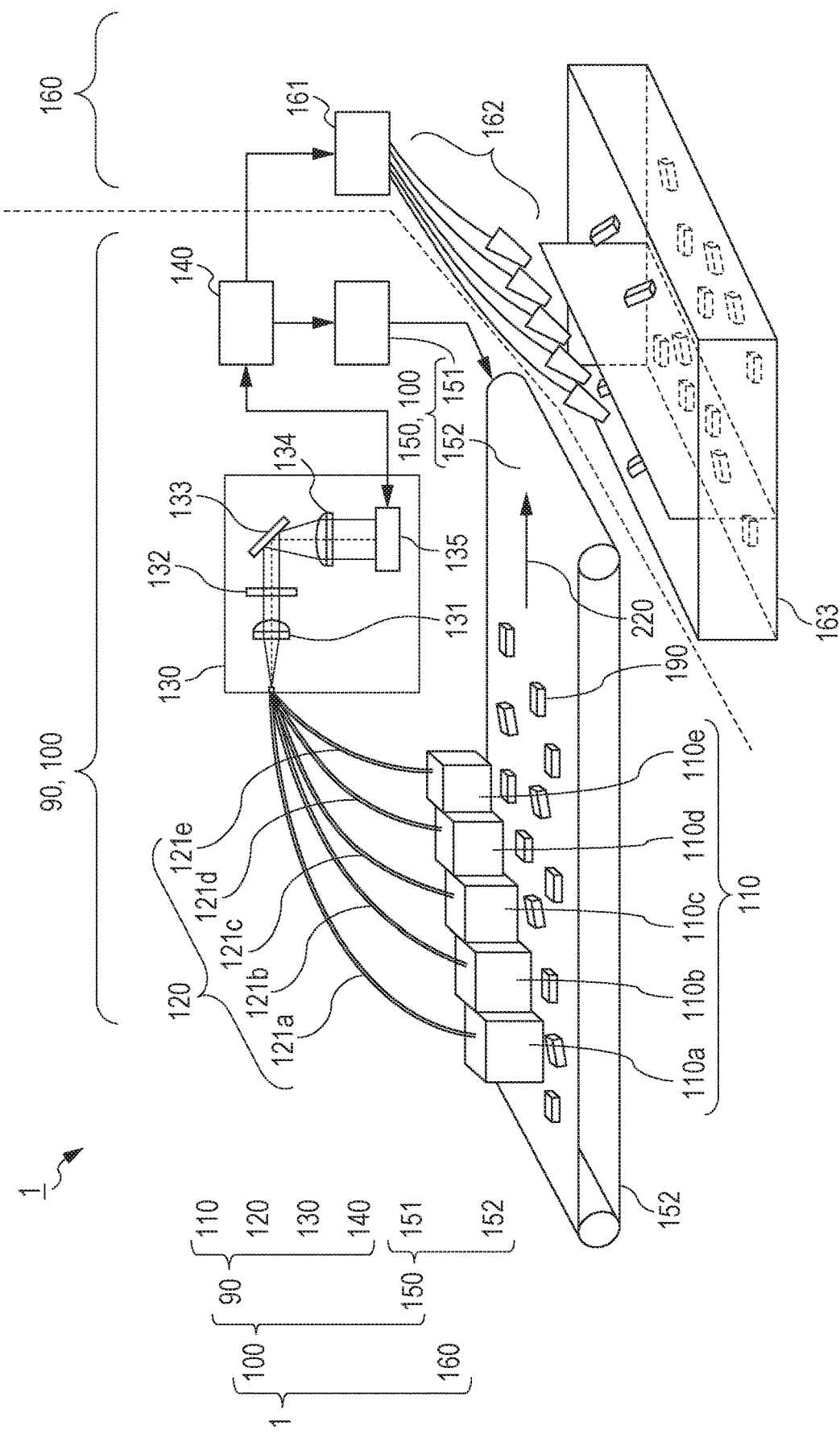
FIG. 1 schematically illustrates the configuration of a sorting system.
Figure 2:
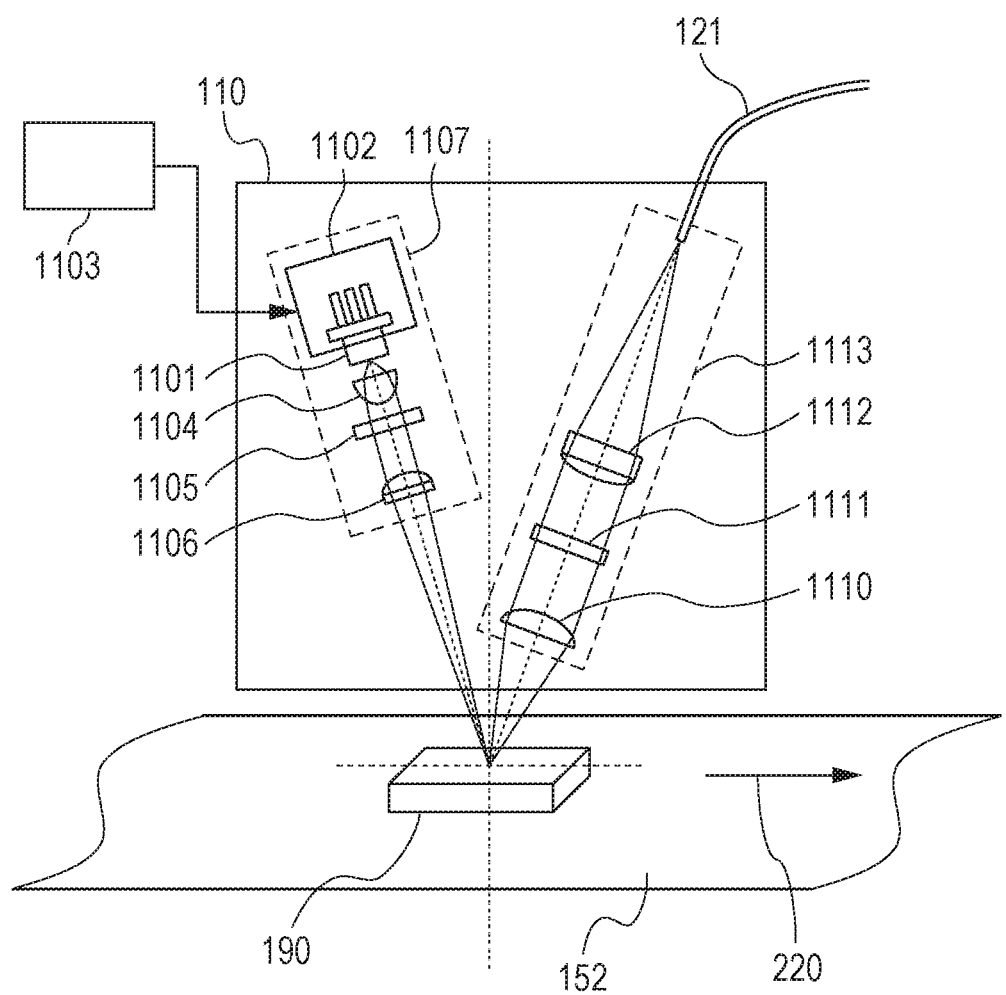
FIG. 2 schematically illustrates an example of the configuration of a light capturing unit.
Figure 3:
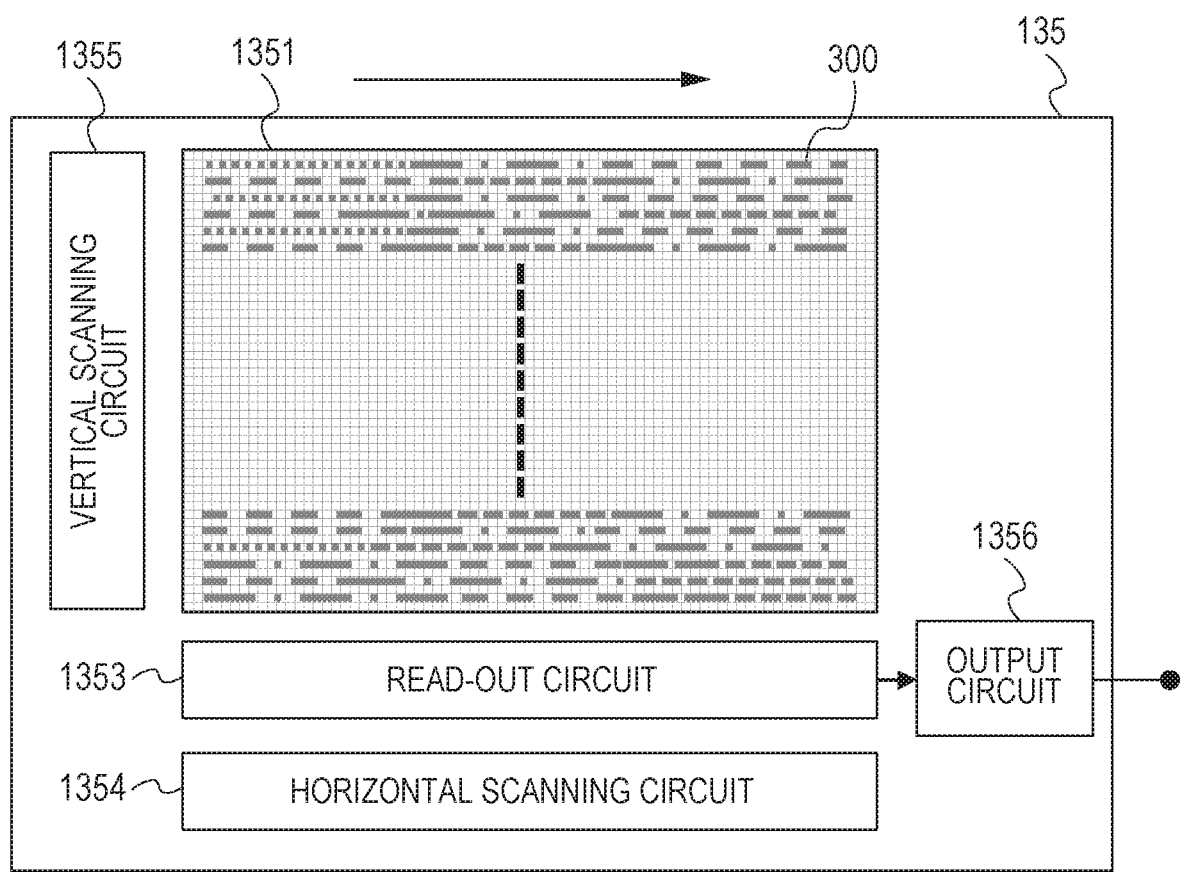
FIG. 3 schematically illustrates the configuration of an imaging unit.

Referring to FIGS. 1 to 3, a sorting system 1 according to a first embodiment of the present invention will be described. FIG. 1 schematically illustrates the sorting system 1 according to the first embodiment.

The sorting system 1 according to the present embodiment is a system configured to include a conveyance unit 150, configured to perform an identification process of identifying the type of a sample 190 conveyed by the conveyance unit 150, and configured to sort components included in the sample 190 in accordance with the identification result.

Here, examples of the components included in the sample 190 include metal pieces mainly including metals, ceramic pieces mainly including metal oxide crystals, glass pieces including amorphous metal oxides, resin pieces mainly including resins, and the like. In many cases, the sample 190 is made by crushing household waste, industrial waste, and the like. In other words, the sample 190 has been subjected to a crushing process as a preprocess. Here, the term "resin" in the present specification refers to organic polymers in general, including thermoplastic resins (plastics), thermosetting resins, rubber, elastomers, cellulose, paper, and the like. The sample 190 may include, in addition to a synthetic resin, glass, a filler such as fiber, and an additive such as fire retardant and plasticizer. The sorting system 1 according to the present embodiment performs, in addition to identification of the types of resins included in a resin piece, detection and identification of the type of such an additive.

As illustrated in FIG. 1, the sorting system 1 includes an identification apparatus 100 and a sorting apparatus 160. As illustrated in FIG. 1, the identification apparatus 100 includes an identification unit 90 and the conveyance unit 150. The identification unit 90 includes a light capturing unit 110, an optical fiber unit 120 that transmits Raman scattered light fluxes captured by the light capturing unit 110 to a spectroscope 130, and a computer 140 configured to perform a computation process for identification based on an output result from the spectroscope 130.

The light capturing unit 110 includes a plurality of light-capturing portions 110a to 110e and captures Raman scattered light fluxes from a plurality of samples placed in the transverse direction of a conveyance path described below. The optical fiber unit 120 includes a plurality of optical fibers 121a to 121e, which are bundled on the spectroscope 130 side. The spectroscope 130 includes an imaging lens 131, a long-pass filter 132, a diffraction grating 133, an imaging lens 134, and an imaging unit 135. The optical fiber unit 120 includes a plurality of optical fibers 121a to 121e, and the optical fibers 121a to 121e are respectively connected to the plurality of light-capturing portions 110a to 110e. Raman scattered light fluxes captured by the light capturing unit 110 are guided to the diffraction grating 133 in parallel. Here, a configuration including five light-capturing portions 110a to 110e will be described. However, the number of the light capturing units 110 and the number of the optical fibers 121 corresponding thereto are not limited, as long as the numbers are plural. The imaging lens 131 collimates light from the optical fibers 121 into parallel rays. The long-pass filter 132 is disposed between the imaging lens 131 and the diffraction grating 133, removes remaining excitation light components, and transmits Raman scattered light fluxes.

The identification apparatus 100 includes: the identification unit 90 configured to include the light capturing unit 110, the optical fiber unit 120, the spectroscope 130, the computer 140; and the conveyance unit 150 configured to convey the sample 190 placed on the conveyance surface. The conveyance unit 150 further includes a belt conveyer 152 and a driving motor 151 configured to drive the belt conveyer 152. The identification apparatus 100 according to the present embodiment includes the identification unit 90 and the conveyance unit 150.

The conveyance unit 150 conveys the sample 190, which is supplied from a sample supply unit (not shown), to a measurement position at a predetermined speed. As the conveyance unit 150, instead of the belt conveyer 152, any conveyer, such as a turntable, a transport drum, or the like, that can convey the sample 190 placed on the conveyance surface may be used. The sorting system 1 according to the present embodiment performs Raman scattering measurement while the sample 190 is conveyed by the conveyance unit 150. After measurement, the sample 190 is conveyed in a conveyance direction, and the sorting apparatus 160 sorts the sample 190 based on an identification result obtained by the identification apparatus 100.

The sorting system 1 includes the sorting apparatus 160, which is disposed downstream of the light capturing unit 110 in a conveyance direction 220 of the conveyance unit 150. The sorting apparatus 160 performs sorting of the sample 190 based on an identification result obtained by the identification apparatus 100.

Hereafter, the components of the sorting system 1 will be described in detail.

Light Capturing Unit

FIG. 2 schematically illustrates an example of the configuration of the light capturing unit 110. The light capturing unit 110 includes an illumination optical system 1107 configured to irradiate the sample 190 with light, and a light-capturing optical system 1113 configured to capture a Raman scattered light flux from the sample 190.

The illumination optical system 1107 is an optical system configured to irradiate the sample 190 on the conveyance surface of the conveyance unit 150 with light from a light source. The sample 190 irradiated with light by the illumination optical system 1107 emits a Raman scattered light flux. At this time, the intensity of the Raman scattered light flux emitted from the sample 190 is very low and is approximately $10^{-6}$ times the intensity of a Rayleigh scattered light flux that is simultaneously generated, that is elastically scattered, and that does not exhibit wavelength shift. As illustrated in FIG. 2, the illumination optical system 1107 includes a semiconductor laser 1101, a laser mount 1102, a laser driver 1103, a collimator lens 1104, a cylindrical lens 1105, and a condenser lens 1106.

The semiconductor laser 1101 is a source of light with which the sample 190 is irradiated. In the present embodiment, the semiconductor laser 1101 is a continuous-wave laser and emits light with an intensity necessary for causing a Raman scattered light flux to be emitted from the sample 190. The efficiency of occurrence of Raman scattering increases as the wavelength of illumination light decreases and as the wavelength of illumination light increases. On the other hand, the intensity of fluorescent light, which is background noise for a Raman scattered light flux, decreases as the wavelength of illumination light increases and increases as the wavelength of illumination light decreases.

For example, light having a wavelength of 532 nm, 633 nm, or 780 nm may be used as light from the semiconductor laser 1101. In the example described here, the semiconductor laser 1101 is used as the light source of the illumination optical system 1107. However, the light source is not limited to this, and another laser light source such as a semiconductor-pumped solid-state laser, a gas laser, or the like may be used. The wavelength of a light source used for the illumination optical system 1107 is selected in consideration of a Raman shift that is specific to a material to be identified, a signal-to-noise ratio, and the like.

The laser mount 1102 holds the semiconductor laser 1101 and dissipates heat. The laser driver 1103 supplies an electric current to the semiconductor laser 1101 via the laser mount 1102, causes the semiconductor laser 1101 to emit a laser beam, and simultaneously keeps the temperature of the semiconductor laser 1101 to be constant. The laser driver 1103 may be provided for each light capturing unit 110, or one laser driver 1103 may be provided for a plurality of light capturing units 110.

The collimator lens 1104 and the cylindrical lens 1105 limit spreading of light emitted from the semiconductor laser 1101 and collimates the light into parallel rays. Instead of the cylindrical lens 1105, another collimating optical element, such as an anomorphic prism pair, may be used. In the illumination optical system 1107, a wavelength filter (not shown) including a laser line filter may be disposed. The wavelength filter may be disposed at the position of the pupil plane of the illumination optical system 1107. With the wavelength filter, the illumination optical system 1107 can improve the wavelength characteristics of light with which the sample 190 is irradiated. The condenser lens 1106 focuses light from the semiconductor laser 1101 onto the sample 190. As the collimator lens 1104, the cylindrical lens 1105, and the condenser lens 1106, lenses made of synthetic quartz may be used. Because high-intensity light from the semiconductor laser 1101 passes through these lenses, by using lenses made of synthetic quartz, it is possible to reduce fluorescent light, which is background noise, and a Raman scattered light flux deriving from a trace component included in an observation system.

The condenser lens 1106 may be omitted, provided that a Raman scattered light flux having a sufficient intensity for identification can be obtained from the sample 190. That is, the illumination optical system 1107 may be configured so that the sample 190 is irradiated directly with light collimated by the collimator lens 1104 and/or the cylindrical lens 1105.

The light-capturing optical system 1113 is an optical system configured to capture a Raman scattered light flux from the sample 190 irradiated with light by the illumination optical system 1107. The Raman scattered light flux captured by the light-capturing optical system 1113 is guided to the diffraction grating 133 by the optical fiber 121, which is a light guide unit. The light-capturing optical system 1113 includes an objective lens 1110, an excitation light cut filter 1111, and a fiber condenser lens 1112.

The objective lens 1110 captures the Raman scattered light flux from the sample 190 irradiated with light by the illumination optical system 1107. Each lens, such as the objective lens 1110, of the light-capturing optical system 1113 may be irradiated with high power light depending on the sample 190. Therefore, as the lens, a lens made of synthetic quartz may be used in order to reduce fluorescent light, which is background noise, and a Raman scattered light flux deriving from an observation system. Likewise, use of a bonded lens may be avoided, in order to suppress background noise from balsam and to suppress removal of balsam due to heat. That is, each of the lenses, such as the objective lens 1110, of the light-capturing optical system 1113 may be a single lens. In order to improve the coupling effect to the optical fiber 121, which is a light guide unit, the objective lens 1110 may be an aspherical lens.

The excitation light cut filter 1111 is a wavelength filter such as a band-pass filter or a long-pass filter. The excitation light cut filter 1111 blocks at least a part of light captured by the objective lens 1110 and transmits a Raman scattered light flux. Thus, the excitation light cut filter 1111 blocks light that is not necessary for measurement of a Raman scattered light flux and transmits the Raman scattered light flux. In view of filter characteristics, the excitation light cut filter 1111 is disposed in collimated rays between the objective lens 1110 and the fiber condenser lens 1112, that is, in the pupil plane of the light-capturing optical system 1113.

The fiber condenser lens 1112 couples a Raman scattered light flux to the optical fiber 121. In a case where the excitation light cut filter 1111 is inserted, because a Raman scattered light flux from the fiber condenser lens 1112 is negligible, in order to prioritize the coupling efficiency to the optical fiber 121, a bonded lens such as a doublet lens may be used to suppress aberration.

In the present embodiment, the illumination optical system 1107 and the light-capturing optical system 1113 of the light capturing unit 110 are independent from each other. However, this is not a limitation. That is, the illumination optical system 1107 and the light-capturing optical system 1113 may share some of the optical elements, such as lenses, of the optical systems thereof.

The plurality of light capturing units 110 are disposed at positions that face the conveyance surface of the conveyance unit 150 and that differ from each other in a direction perpendicular to the conveyance direction of the conveyance unit 150. That is, the plurality of light capturing units 110 are disposed at positions that differ from each other in the transverse direction of the conveyance unit 150. Each of the light capturing units 110 irradiates the sample 190 that passes through the inside of a predetermined region on the conveyance surface of the conveyance unit 150, and captures a Raman scattered light flux from the inside of predetermined region. Therefore, a region from which each light capturing unit 110 can capture light is limited. Therefore, as in the present embodiment, by providing a plurality of light capturing units 110 and arranging these in the transverse direction of the conveyance unit 150, it is possible to enlarge the range where identification of the sample 190 can be performed. Thus, the throughput of the identification process and the sorting process can be improved.

The plurality of light capturing units 110 may be disposed at different positions also in the conveyance direction of the conveyance unit 150. Each light capturing unit 110 has a size sufficient for holding the illumination optical system 1107 and the light-capturing optical system 1113 therein. Therefore, by arranging the plurality of light capturing units 110 diagonally as viewed in a direction perpendicular to the conveyance surface of the conveyance unit 150, the disposition density of the light capturing units 110 in the transverse direction of the conveyance unit 150 can be increased. Thus, it is possible to increase the resolution of identification by the sorting system 1 and to identify the sample 190 having a smaller size.

Optical Fiber Unit

The optical fiber unit 120 is a light guide unit configured to guides Raman scattered light fluxes respectively captured by the plurality of light capturing units 110 to the spectroscope 130. The optical fiber unit 120 includes a plurality of optical fibers 121a to 121e that respectively correspond to the plurality of light-capturing portions 110a to 110e. Inlet ends of the optical fibers 121 are respectively disposed so that light beams from the light-capturing optical systems 1113 of the corresponding light capturing units 110 can enter thereinto. On the other hand, the plurality of optical fibers 121 are bundled at emission ends thereof and are configured so that Raman scattered light fluxes from the plurality of light capturing units 110 are guided to one spectroscope 130. Here, an example in which only one spectroscope 130 is provided has been described. However, the number of the spectroscopes 130 may be any number smaller than the number of the light capturing units 110. With such a configuration, it is possible to reduce the number of the spectroscopes 130, each of which is generally expensive, to simplify the configuration of the sorting system, and to reduce cost. Moreover, it is possible to reduce measurement error and variation due to the spectroscopes 130, and to improve the identification accuracy and sorting accuracy of the sorting system.

In FIG. 1, the plurality of optical fibers 121 of the optical fiber unit 120 are bundled at an emission end portion (end portion adjacent to the spectroscope 130) of the optical fiber unit 120, and are arranged in a row. The arrangement direction of the emission ends of the optical fiber unit 120 is determined based on the positional relationship relative to the diffraction grating 133 and the imaging unit 135. In FIG. 1, the emission ends of the optical fiber unit 120 are arrange along a line in an arrangement direction substantially perpendicular to the plane of FIG. 1. Accordingly, Raman scattered light fluxes guided by the respective optical fibers 121 are also arranged along a line in the direction perpendicular to the plane of the figure, and enter the spectroscope 130. Each of the of Raman scattered light fluxes is dispersed by the diffraction grating 133 of the spectroscope 130 in a direction perpendicular to the arrangement direction of the optical fibers 121 at the emission end portion of the optical fiber unit 120, that is, a direction parallel to the plane of FIG. 1.

Spectroscope

The spectroscope 130 at least includes a spectral element configured to disperse Raman scattered light fluxes captured by the light-capturing optical system 1113, and an imaging unit configured to receive Raman scattered light fluxes dispersed by the spectral element; and disperses the Raman scattered light fluxes and generates a spectral signal. The spectroscope 130 includes the imaging lens 131, the long-pass filter 132, the diffraction grating 133 that is the spectral element, the imaging lens 134, and the imaging unit 135.

The imaging lens 131 collimates light from the optical fibers 121 into parallel rays. The long-pass filter 132 is disposed between the imaging lens 131 and the diffraction grating 133, removes remaining excitation light components, and transmits Raman scattered light fluxes.

The diffraction grating 133 disperses Raman scattered light fluxes captured by the light-capturing optical system 1113 and disperses the Raman scattered light fluxes one-dimensionally for each wavelength. The imaging lens 134 forms an image of light, dispersed by the diffraction grating 133, on the imaging unit 135. Thus, a linear spectral image is formed on the light-receiving surface of the imaging unit 135. The optical dispositions and the spectral method of each constituent element in the spectroscope 130 may be changed to any other disposition and method that are generally used, such as a Rowland disposition and a Czerny-Turner method.

Imaging Unit

The imaging unit 135 includes a plurality of imaging elements that are arranged in order to receive a plurality of Raman scattered light fluxes each of which has been one-dimensionally dispersed by the diffraction grating 133, which is the spectral element, and to perform photoelectric conversion. The imaging unit 135 is an area image sensor in which photoelectric conversion elements are arranged two-dimensionally in the direction perpendicular to the plane of FIG. 1 and the direction parallel to the plane of the figure. By disposing the optical fiber unit 120 and the diffraction grating 133 as described above, a plurality of spectral images, which are formed by projecting Raman scattered light fluxes that have been respectively guided by the plurality of optical fibers 121 and dispersed, are arranged on the light-receiving surface of the imaging unit 135 in the direction perpendicular to the plane of the figure. On the light-receiving surface of the imaging unit 135, the wavelength components of each spectral image are distributed in the direction parallel to the plane of the figure.

FIG. 3 is a schematic view illustrating the configuration of the imaging unit 135. The imaging unit 135 includes a pixel portion 1351 in which pixels, each including a photoelectric conversion element, are arranged in a matrix pattern. On the light-receiving surface of the imaging unit 135, images of Raman scattered light fluxes, which have been respectively guided by the plurality of optical fibers 121 of the optical fiber unit 120 and dispersed by the diffraction grating 133, are formed, and a plurality of spectral images 300 are projected. Here, the spectral images are shown by a dotted-line pattern so that the magnitude of light intensity thereof can be easily seen. The imaging unit 135 converts the spectral images 300 into electric signals, which are output to the computer 140 as light-intensity information for each wavelength, that is, spectral data.

In other words, the pixel portion 1351 defines an effective imaging area of the imaging unit 135. The pixel portion 1351 includes pixels that are two-dimensionally arranged, and can capture a two-dimensional image that is scanned by a combination of main scanning and sub-scanning. In the present specification, sub-scanning is performed in the sub-scanning direction configured to cross the main scanning direction of main scanning and at a frequency lower than the frequency of main scanning Main scanning is generally performed at a frequency that is N times or higher of the sub-scanning frequency, where N is the number of pixel lines that are included in the pixel portion 1351 and that are sub-scanned.

Here, the sorting system 1 identifies the type of the sample 190 while conveying the sample 190 by using the conveyance unit 150, and sorts the sample 190 by using the sorting apparatus 160 described below in accordance with the identification result. Therefore, in order to increase the throughput of the sorting process performed by the sorting system 1, the conveyance speed with which the conveyance unit 150 conveys the sample 190 may be increased. A spectral image to be projected onto the imaging unit 135 is formed from a Raman scattered light flux that is generated from the sample 190 being moved on the conveyance surface of the conveyance unit 150. Therefore, the spectral image is formed on the imaging unit 135 while the sample 190 that is conveyed is present in a detectable region of the light capturing unit 110. For example, in a case where the conveyance speed of the conveyance unit 150 is 2 m/s and the size of the sample 190 is 10 mm, the time for which the imaging unit 135 can detect a spectral image formed by a Raman scattered light flux emitted from the sample 190 is 5 milliseconds or shorter. Accordingly, the imaging unit 135 needs to have a high frame rate. An example of an imaging unit having such a high frame rate is a CMOS image sensor, and accordingly, the imaging unit 135 may be a CMOS image sensor.

As described above, because the intensity of the Raman scattered light flux emitted from the sample 190 is very low, the intensity of light that is incident on each pixel of the pixel portion 1351 of the imaging unit 135 is also very low. Accordingly, as the imaging unit 135, a device configured to include high sensitivity in a wavelength range for acquiring the spectral images 300 may be used. In general, an image sensor using a rolling shutter method, which has a simple pixel structure and high numerical aperture and which can have a large photoelectric conversion element compared with an image sensor using a global shutter method, can increase sensitivity and dynamic range. Due to the simple pixel structure, the image sensor using a rolling shutter method also has an advantage of lower cost than the image sensor using a global shutter method. For these reasons, in the present embodiment, a CMOS image sensor using a rolling shutter method is used as the imaging unit 135.

The imaging unit 135 may be an image sensor using a rolling reset method that serially perform a reset operation for each pixel line. In this case, it is possible to maximally increase the exposure time and to increase sensitivity.

The imaging unit 135 may have a crop read-out function of reading out a specific pixel line of the pixel portion 1351. In this case, for example, when another detector detects that the sample 190 has reached a detectable region of a light capturing unit 110, it is possible to perform an operation of reading-out a pixel line corresponding to the light capturing unit 110.

The imaging unit 135 includes a read-out circuit 1353, a horizontal scanning circuit 1354, a vertical scanning circuit 1355, and an output circuit 1356. The imaging unit 135 serially reads out a signal for each line, from the plurality of pixels arranged in a matrix pattern. The vertical scanning circuit 1355 selects and drives a pixel line in the pixel portion 1351. A read-out circuit 207 reads out a signal output from the pixels of the line selected by the vertical scanning circuit 1355, and transfers the signal to the output circuit 1356 in accordance with control by the horizontal scanning circuit 1354. Thus, read-out in the main scanning direction (column direction) is performed. Moreover, the vertical scanning circuit 1355 shifts the selected line, and the read-out circuit 1353 performs read-out in the main scanning direction in accordance with control by the horizontal scanning circuit 1354. By repeating this operation and shifting the selected pixel line in the sub-scanning direction (row direction), signals can be read out from the entirety of the pixel portion 1351. The read-out signals are output to the outside of the imaging unit 135 via the output circuit 1356. At this time, although scanning in the main scanning direction is performed at high speed, scanning in the sub-scanning direction is slower than scanning in the main scanning direction.

In the present embodiment, the optical fiber unit 120, the diffraction grating 133, and the imaging unit 135 are disposed so that each of the spectral images formed by the plurality of Raman scattered light fluxes dispersed by the diffraction grating 133 is projected along the main scanning direction of the imaging unit 135. In other words, the optical fiber unit 120, the diffraction grating 133, and the imaging unit 135 are disposed so that the diffraction direction of the diffraction grating 133 coincides with the main scanning direction of the imaging unit 135. In other words, emission ends and the diffraction grating 133 (spectral element) are disposed so that a spectral image formed on the imaging unit 135 so as to correspond to one of the plurality of Raman scattered light fluxes extends in the main scanning direction of the imaging unit 135. Moreover, in other words, the spectral images of the plurality of Raman scattered light fluxes dispersed by the diffraction grating 133 (spectral element) are respectively projected to different position on the imaging unit 135 along the sub-scanning direction. Thus, it is possible to read out signals of spectral images on the light-receiving surface of the imaging unit 135 at high speed and to improve the throughput of the identification process.

Here, a case where the spectral images are inclined at a large angle with respect to the main scanning direction of the imaging unit 135 will be considered. For example, when the spectral images are inclined by 90° with respect to the main scanning direction of the imaging unit 135, read-out of all of the spectral images does not finish before reading out of signals in the sub-scanning direction finishes, and the throughput considerably decreases. Moreover, as the timing of exposure shifts for each line, a signal due to a Raman scattered light flux from another sample 190 may be mixed in the spectral data of one spectral image. Thus, if the projected spectral images are inclined at a large angle with respect to the main scanning direction of the imaging unit 135, the time resolution of spectral data decreases.

Accordingly, in order to read out signals of spectral images at high speed and to improve the time resolution of spectral data, the angle between the projected spectral images and the main scanning direction of the imaging unit 135 may be reduced. For example, the angle between the spectral images and the main scanning direction of the imaging unit 135 may be 0° or larger and 5° or smaller, and further, 0° or lager and 3° or smaller. The entirety of one spectral image may be projected onto a smaller number of pixel lines, and further, projected into one pixel line. Further, the spectral images and the main scanning direction of the imaging unit 135 may be parallel to each other.

Data Processor

The computer 140 acquires the spectral data of Raman scattered light fluxes from the imaging unit 135. The computer 140 appropriately outputs a driving signal and a stop signal to the driving motor 151 configured to drive the conveyance unit 150. The computer 140 extracts the Raman spectrum of the sample 190 from the received measurement data, and by analyzing the Raman spectrum, performs an identification process of identifying the type of the measured sample 190. As the identification method, identification may be performed by using a method based on the characteristic peak of a Raman spectrum and collation with a known spectrum, which is described in, for example, Japanese Patent Application Laid-Open No. 2008-209128 and Japanese Patent Application Laid-Open No. H10-038807). The computer 140 performs, in addition to identification of a resin material, analysis that is generally available by Raman spectroscopy, such as detection of an additive and identification of an impurity based on detection of the specific peak of a Raman spectrum and collation with data base. The computer 140 may include a display portion such as a flat panel display, and an input portion, such a keyboard, a mouse, and a touch panel; and may receive a command from a user or may provide a user with information. The computer 140 may perform various processes on the acquired spectral data, such as smoothing, slope correction, addition of pixel data in a predetermined spectrum range, and computation process between pixel data items. Instead of the computer 140, an FPGA having these functions as data processor may be used.

Sorting Apparatus

The sorting system 1 includes the sorting apparatus 160 configured to sort the sample 190 based on an identification result obtained by the identification apparatus 100. The sorting apparatus 160 includes an air-gun driving device 161, and a plurality of air guns 162 arranged in a direction perpendicular to the conveyance direction of the conveyance unit 150. In the present specification, the term "identification" and "sorting" are used as different concepts as follows. The term "identification" means identification of the materials of a sample or the properties of a sample; and the term "sorting" means identification of the use of a sample. The materials of a sample include the composition, the main component, and ingredient substances; and the properties of a sample include physical properties and characteristic values, such as the density, the surface roughness, the surface energy, the modulus of elasticity, and the coefficient of linear expansion. The use of a sample includes: disposal such as scrapping, recycling, and additional analysis; and performing sorting and marking based on the destination to which the sample is to be supplied.

The computer 140 transmits an air-gun driving signal to the air-gun driving device 161 in accordance with the result of the identification process. At this time, the computer 140 calculates the conveyance time of the conveyance unit 150 and the time required by the air gun 162 to eject air, and transmits the air-gun driving signal with an appropriate delay time. That is, the computer 140 also has a function of a synchronizer configured to synchronize the sorting apparatus and the conveyance unit 150. Thus, the air gun 162 can shoot a desired one of the plurality of samples 190 while the sample 190 is falling.

A sorting basket 163 is disposed downstream of the conveyance unit 150 in the conveyance direction 220. The sample 190 conveyed by the conveyance unit 150 jumps out from an end portion of the conveyance unit 150 and falls into the sorting basket 163. The sorting basket 163 is divided into a plurality of small chambers, and contains the samples 190 by types in accordance with sorting by the sorting apparatus.

In the present embodiment, the air gun 162 ejects compressed air when an air-gun driving signal is "ON", and, based on the identification result obtained by the identification apparatus 100, shoots a sample to be sorted in a direction upstream in the conveyance direction. Thus, the sample to be sorted is contained in a small chamber configured to be disposed in an upstream part of the sorting basket 163 in the conveyance direction.

Thus, the sorting apparatus 160 can sort the sample 190, which includes resin pieces, based on the identification result obtained by the identification apparatus 100. The sorting apparatus described above is an example, and is not limited to this. As the sorting apparatus, another sorting apparatus, such as a robot hand, may be used.

An arranger configured to arrange a plurality of samples 190 conveyed by the conveyance unit 150, and a preprocessor configured to adjust the shape and the size of the plurality of samples 190 may be disposed upstream of the conveyance unit 150. As the arranger and the preprocessor, for example, a vibration conveyor, a vibration sieve, a crusher/grain-grader, and the like may be used.

As described above, in the present embodiment, the configuration of the resin identification apparatus is simplified by integrating a spectroscope portion by using the optical fiber unit 120 and by simultaneously detecting a plurality of spectral images by using the imaging unit 135. Moreover, by making a plurality of spectral images to be projected along the main scanning direction of the imaging unit 135, the throughput of the identification process can be increased.

Embodiment(s) of the present invention can also be realized by a computer of a system or apparatus configured to read out and execute computer executable instructions (e.g., one or more programs) recorded on a storage medium (which may also be referred to more fully as a 'non-transitory computer-readable storage medium') to perform the functions of one or more of the above-described embodiment(s) and/or configured to include one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An identification apparatus configured to identify a resin included in a sample, comprising:
   a plurality of light capturing units configured to capture a plurality of Raman scattered light fluxes from a plurality of samples;
   a plurality of optical fibers configured to guide the plurality of captured Raman scattered light fluxes;
   a spectral element configured to disperse the plurality of guided Raman scattered light fluxes;
   an imaging unit configured to be disposed so as to receive the plurality of dispersed Raman scattered light fluxes and configured to capture an image by performing main scanning and sub-scanning, the sub-scanning being performed in a sub-scanning direction configured to cross a main scanning direction of the main scanning and at a frequency lower than a frequency of the main scanning; and
   a data processor configured to acquire spectral data of the plurality of Raman scattered light fluxes from the imaging unit and configured to perform an identification process of identifying the sample,
   wherein the plurality of optical fibers have emission ends configured to guide the plurality of Raman scattered light fluxes toward the spectral element, and the emission ends and the spectral element are disposed so that a spectral image configured to be formed on the imaging unit so as to correspond to one of the plurality of Raman scattered light fluxes extend along the main scanning direction of the imaging unit.

2. The identification apparatus according to claim 1, wherein the imaging unit is an area image sensor.

3. The identification apparatus according to claim 2, wherein the area image sensor is a CMOS image sensor.

4. The identification apparatus according to claim 1, wherein an angle between a projection direction of the spectral image and the main scanning direction is 0° or larger and 5° or smaller.

5. The identification apparatus according to claim 1, wherein the number of the spectral element and the number of the imaging unit are each smaller than the number of the light capturing units.

6. The identification apparatus according to claim 1, further comprising:
   a conveyance unit configured to include a conveyance surface on which the sample is placed and configured to convey the sample in a predetermined conveyance direction.

7. The identification apparatus according to claim 6, wherein the plurality of light capturing units are disposed at positions that differ from each other in a transverse direction of conveyance configured to cross the conveyance direction.

8. The identification apparatus according to claim 6, wherein the plurality of light capturing units are disposed at positions that differ from each other in the conveyance direction.

9. The identification apparatus according to claim 1, wherein, at an emission end portion of an optical fiber unit, the plurality of optical fibers have portions are arranged in a row.

10. The identification apparatus according to claim 1, wherein the plurality of light capturing units each includes an illumination optical system configured to irradiate the sample with light.

11. The identification apparatus according to claim 1, wherein a shutter method of the imaging unit is a rolling shutter method.

12. The identification apparatus according to claim 11, wherein a reset method of the imaging unit is a rolling reset method.

13. The identification apparatus according to claim 1, wherein spectral images of the plurality of Raman scattered light fluxes dispersed by the spectral element are respectively projected to different positions on the imaging unit along the sub-scanning direction.

14. A sorting system comprising:
   the identification apparatus according to claim 6; and
   a sorting apparatus configured to be disposed downstream of the conveyance unit in the conveyance direction and configured to sort the sample based on an identification result obtained by the identification apparatus.

* * * * *